United States Patent
Loveless

[15] 3,661,182
[45] May 9, 1972

[54] FOUR-WAY VALVE WITH BLOCKED CENTER

[72] Inventor: Stanley M. Loveless, Oshtemo, Mich.

[73] Assignee: General Gas Light Company, Kalamazoo, Mich.

[22] Filed: Feb. 24, 1970

[21] Appl. No.: 13,325

[52] U.S. Cl. ..................................... 137/625.48
[51] Int. Cl. ........................................ F16k 11/02
[58] Field of Search ............... 137/625.48, 625.69; 251/324, 251/DIG. 1

[56] References Cited

UNITED STATES PATENTS

| | | | |
|---|---|---|---|
| 2,115,383 | 4/1938 | Christensen | 60/54.6 |
| 3,191,626 | 6/1965 | Leibfritz | 137/625.64 X |
| 2,638,122 | 5/1953 | Ludwig | 137/625.48 X |
| 2,933,285 | 4/1960 | Tucker | 251/324 |
| 2,993,511 | 7/1961 | Johnson | 137/625.64 |

FOREIGN PATENTS OR APPLICATIONS

| | | | |
|---|---|---|---|
| 672,969 | 5/1952 | Great Britain | 137/625.48 |
| 829,785 | 3/1960 | Great Britain | 137/625.69 |
| 1,332,592 | 6/1963 | France | 137/625.68 |

*Primary Examiner*—Samuel Scott
*Attorney*—Woodhams, Blanchard and Flynn

[57] ABSTRACT

A valve assembly having a valve spool shiftably mounted within a housing and provided with an alignment sleeve surrounding the spool. The alignment sleeve is supported on the housing by a resilient seal ring for permitting limited relative movement between the sleeve and the housing. The alignment sleeve and the housing define axially therebetween a narrow ring-like passage surrounding the valve spool for providing communication between a pair of ports formed in the housing. The valve spool has a resilient seal ring positioned thereon, which seal ring is adapted to completely cover the ring-like passage when the valve spool is shifted between its extreme positions.

11 Claims, 10 Drawing Figures

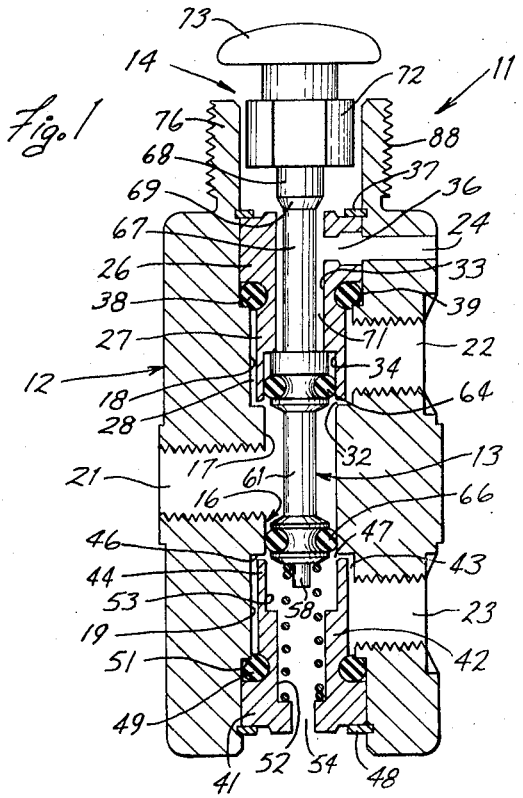

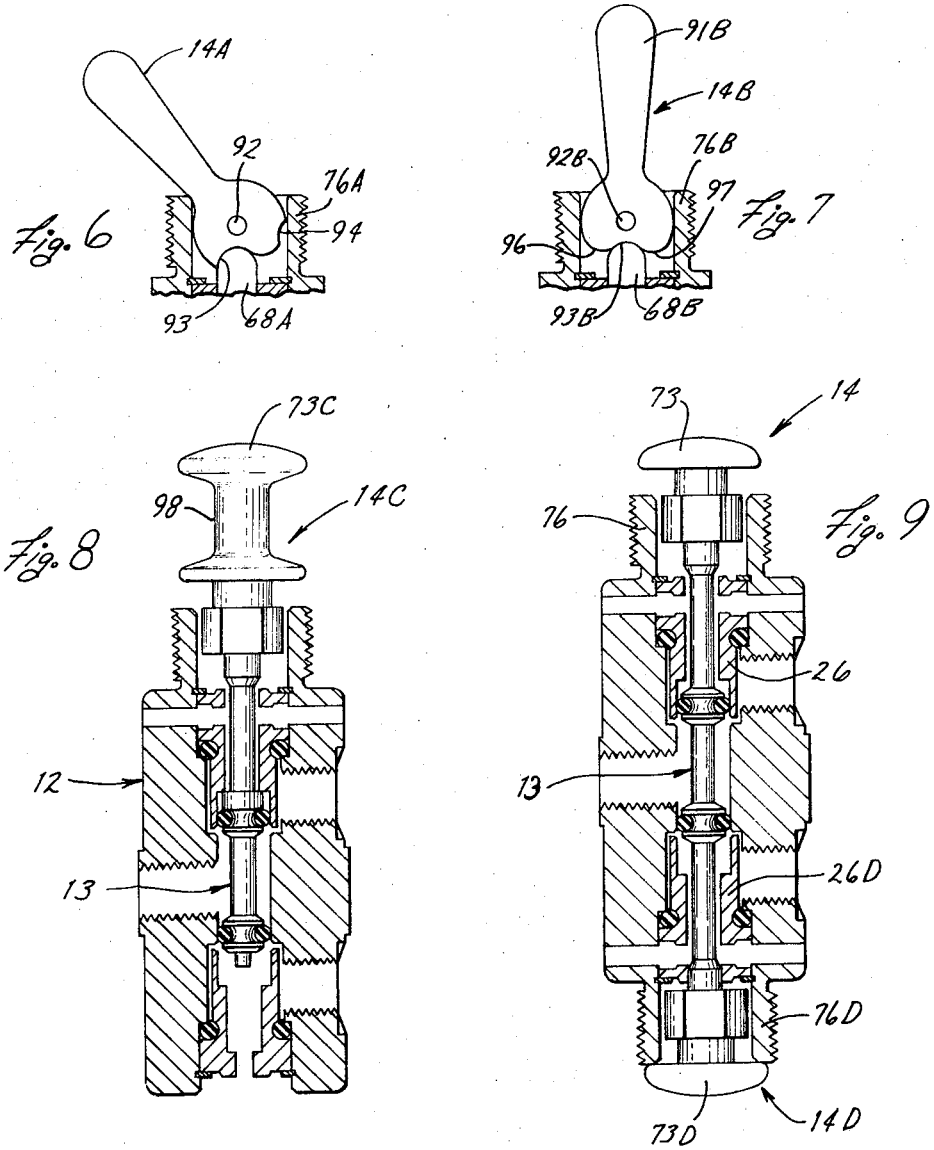

FOUR-WAY VALVE WITH BLOCKED CENTER

FIELD OF THE INVENTION

A valve assembly and, in particular, an improved valve assembly having a shiftable valve spool and usable as a four-way valve.

BACKGROUND OF THE INVENTION

While a multitude of valves of the shiftable spool type have been designed and used for an almost infinite number of purposes in all phases of industrial activity, nevertheless the manufacturing cost of such valves has remained relatively high and the amount of required maintenance has often exceeded desirable limits. As is well known, valve spools, particularly for a four-way valve assembly, are often slideably and sealingly supported adjacent opposite ends thereof within a bore or passageway formed within the valve housing. To provide the desired sliding and sealing engagement between the spool and the housing, both the spool and the housing must be manufactured to extremely close tolerances, which thus substantially increases the cost of the overall valve assembly.

While some valve assemblies have attempted to reduce costs by minimizing these close tolerances between the valve spool and the housing, this loosening of the tolerances often results in undesirable fluid leakage and/or undesirable wear of the seal rings, thus undesirably increasing the required maintenance and repair.

Another disadvantage of the prior known valve assemblies has been the rapid wear of the resilient seal rings when disposed on and movably with the valve spool. Most prior known valve assemblies have utilized ports which are bored so as to communicate with the central passage containing the shiftable valve spool therein. While these ports provide the desired fluid communication, they nevertheless are difficult to machine adjacent the inner ends thereof due to the inaccessibility of the inner ends of the ports within the housing. These inner ends thus often result in relatively sharp edges which cause increased wear of the resilient seal rings when the seal rings are mounted on and movable with the valve spool. This problem has thus caused most valve manufacturers to stationarily mount the resilient seal rings on the housing with the seal rings slideably engaging the shiftable spool.

A further disadvantage of many of the prior known valve assemblies has been their inability to permit valve spool shifting in either direction by the application of a minimum external force. Many prior known valve assemblies have utilized an actuator button connected directly to the valve spool with the actuator button being slideably supported within the end of the valve spool passageway. Accordingly, when the valve assembly is shifted so as to vent a pressurized fluid port to the low pressure side of the system, such as the atmosphere, many of the prior known valve assemblies have permitted the pressurized fluid to at least partially enter under the shift button, which fluid then exerted a force on the button and prevents free movement of the button and free shifting movement of the valve spool in the opposite direction.

Still a further disadvantage of many known valve assemblies has been the cross-flow which occurs between the load or cylinder ports during valve spool shifting, and/or the through-flow which occurs between the inlet and the vent ports during valve spool shifting. Such cross-flow or through-flow of fluid is often undesirable since it results in loss of pressurized fluid and/or the contamination of the fluid within one of the load lines. Further, such cross-flow or through-flow of fluid often also causes undesirable noise or whistling during valve spool shifting.

Accordingly, it is an object of the present invention:

1. To provide an improved valve assembly, particularly of the four-way type, which overcomes the numerous disadvantages set forth above.
2. To provide a valve assembly, as aforesaid, wherein the valve spool is slideably supported in the housing by an alignment sleeve which is supported on the housing by a resilient seal ring for permitting limited radial or angular movement of the sleeve relative to the housing.
3. To provide a valve assembly, as aforesaid, whereby liberal manufacturing tolerances can be utilized on both the housing and the valve spool due to the valve spool being supported in the housing by means of a floatable alignment sleeve.
4. To provide a valve assembly, as aforesaid, wherein an annular ring-like passage is positioned in surrounding relationship to the valve spool and a resilient seal ring is mounted on the valve spool for creating a "blocked center" porting arrangement.
5. To provide a valve assembly, as aforesaid, wherein the annular passage is defined by closely positioned axially spaced, surfaces formed separately on the alignment sleeve and the housing, which surfaces can be machined to remove rough edges so as to result in minimum wear of the seal rings mounted on the spool.
6. To provide a valve assembly, as aforesaid, wherein the valve spool is axially connected to an actuator button, which button is provided with a vent passageway therethrough for preventing discharged fluid from accumulating thereunder and impeding the free operation of the spool.
7. To provide a valve assembly, as aforesaid, having a solid stop formed on the housing and coacting with the valve spool for positively limiting the permissible shifting movement thereof.
8. To provide a valve assembly, as aforesaid, which can be rapidly and efficiently manufactured and assembled without requiring extremely close machine tolerances or assembly skills.
9. To provide a valve assembly, as aforesaid, which is efficient in operation and is structurally durable so as to have a long operational life.

Other objects and purposes of the invention will be apparent to persons acquainted with devices of this type upon reading the following specification and inspecting the accompanying drawings.

BRIEF DESCRIPTION OF THE DRAWINGS

FIG. 1 is a central cross-sectional view of a valve assembly constructed according to the present invention, same being illustrated at one end position.

FIG. 2 is a central cross-sectional view similar to FIG. 1 and illustrating the valve spool in a central shifting position wherein all of the ports are closed, the valve spool thus being in the "blocked center" position.

FIG. 3 is a fragmentary enlargement illustrating the manner in which the seal ring on the valve spool sealingly closes the annular passage when in the blocked center position.

FIG. 4 is a central cross-sectional view similar to FIG. 1 and illustrating the valve spool when in the other end position.

FIG. 5 is a sectional view taken along the line V—V of FIG. 2.

FIG. 6 is a fragmentary, sectional view illustrating a different operator usable for shifting the plunger of the valve assembly illustrated in FIG. 1.

FIG. 7 is a fragmentary, sectional view illustrating still a further operator usable for shifting the valve spool of the assembly illustrated in FIG. 1.

FIG. 8 is a central sectional view of a further modification of the present invention.

FIG. 9 is a central sectional view of another modification of the present invention.

Certain terminology will be used in the following description for convenience in reference only and will not be limiting. The terms "upwardly," "downwardly," "rightwardly," and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a housing having a central passageway in which is movably positioned a shiftable valve spool. The housing includes a fluid supply passage and at least one fluid outlet passage in communication with the central passage at axially spaced locations therealong. An alignment sleeve is disposed within the central passage in surrounding relationship to the valve spool and is axially secured relative to the housing. The alignment sleeve is supported on the housing by means of a resilient seal ring which permits the alignment sleeve to have limited angular or radial floating movement relative to the housing so as to coaxially align itself with the central passageway to permit free shifting of the valve spool. The end of the alignment sleeve is disposed adjacent to and axially spaced from an adjacent wall of the housing to define a narrow annular passage therebetween, which passage completely surrounds the valve spool and provides communication between the central passageway and one of the supply and outlet passages. The valve spool is provided with a resilient seal ring surrounding same and axially secured thereto, which seal ring is disposed for sliding sealing engagement with either the interior housing wall defining the central passageway or the interior wall of the sleeve. The seal ring is disposed in sealing engagement with the interior wall defining the central passageway when in one extreme position and the interior wall of the sleeve when disposed in the other extreme position, the valve spool when in one of said positions permitting fluid communication between the inlet and the outlet passages and when in the other extreme position permitting fluid communication between the outlet passage and a vent passage. The resilient seal ring on the valve spool completely seals the annular passage when the valve spool is in an intermediate position during shifting from one extreme to the other, which "blocked center" position completely momentarily isolates the inlet, outlet and vent passages from one another. The shiftable valve spool is controlled by and axially connected to an actuator which contains a vent passageway for preventing accumulation of pressurized fluid thereunder whereby the actuator is able to freely move the valve spool in opposite directions.

DETAILED DESCRIPTION

FIGS. 1-5 illustrate therein a four-way valve assembly 11 constructed in accordance with the present invention, which valve assembly includes a housing 12 having a shiftable valve spool 13 therein. The valve spool is connected to and actuated by an external actuator 14.

Considering first the housing 12, same includes a central passageway 16 extending longitudinally therethrough, which passageway 16 includes a central portion 17 coaxially communicating with identical end portions 18 and 19. The housing 12 is provided with a first fluid passage 21 formed therein and communicating with the center passageway portion 17. Similar second and third fluid passages 22 and 23 are formed in the housing on opposite axial sides of the first fluid passage 21 and are in communication with the end passageway portions 18 and 19, respectively. A vent passage 24 is formed in the housing 12 in communication with the central passageway 16 adjacent one end thereof.

The housing 12 is provided with an alignment sleeve 26 positioned within the passageway portion 18, which alignment sleeve is provided with a reduced diameter portion 27 positioned substantially directly opposite the second fluid passage 22. The reduced diameter portion 27 is of slightly smaller diameter than the interior wall defining the passageway portion 18 so as to define a narrow annular passageway 28 therebetween, which annular passageway 28 is in communication with the second fluid passage 22. One end of the annular passageway 28 (lower end of FIG. 1) communicates with the central passageway 16 by means of an intermediate slot-like annular passage 32. The annular passage 32 extends completely around the shiftable valve spool 13 and is defined by an axial end face 29 (FIG. 3) of the alignment sleeve 26 and a shoulder 31 formed on the housing 12. The axial spacing between the shoulder 31 and the axial end face 29 is relatively small whereby the annular passage 32 is thus of relatively small width in the axial direction of the valve spool. The purpose for the narrow axial width of the annular passage 32 will be explained hereinafter.

The alignment sleeve 26 has a bore 33 extending therethrough, which bore is formed with an enlarged bore portion 34 at its innermost end, the bore portion 34 being of substantially the same internal diameter as the center passageway portion 17. An opening 36 extends radially through the wall of the alignment sleeve 26 for providing communication between the bore 33 and the vent passage 24.

To axially secure the alignment sleeve 26 relative to the housing 12, there is provided a retainer ring 37 adjacent one axial end of the sleeve 26. The sleeve 26 is also axially secured relative to the housing 12 by means of a resilient elastomeric seal ring 38, such as a conventional O-ring, which seal ring 38 surrounds the alignment sleeve 26 and is maintained in sealing engagement with the housing 12. The resilient O-ring 38 bears against a shoulder 39 formed on the housing 12, whereupon the seal ring 38 thus not only axially secures the alignment sleeve 26 relative to the housing 12, but also permits the sleeve 26 to have limited floating movement both radially and angularly relative to the housing whereby the sleeve 26 can thus properly align itself with the center passage portion 17 to permit free sliding or shifting movement of the valve spool 13.

The valve assembly 11 is further provided with another alignment sleeve 41 disposed within the other end passageway portion 19, which alignment sleeve 41 is substantially similar to the alignment sleeve 26 as described above and specifically includes a reduced diameter portion 42 positioned directly opposite the third fluid passage 23. The reduced diameter portion 42 is slightly smaller than the surrounding housing wall so as to define a narrow annular passageway 43 therebetween, which passageway 43 communicates with the third fluid passage 23 and also communicates at one axial end thereof with the central passageway 16 by means of a narrow slot-like annular passage 47. The passage 47 is of relatively narrow axial width and is defined between the housing shoulder 46 and the opposite axial end face 44 of the alignment sleeve 41.

The alignment sleeve 41 is also axially positioned within the housing by means of a retainer ring 48 and a resilient elastomeric seal ring 49, the seal ring 49 abutting against the housing shoulder 51 for permitting limited radial or angular floating of the alignment sleeve relative to the housing 12.

The alignment sleeve 41 is also provided with a bore 52 extending therethrough, which bore is provided at its inner end with an enlarged bore portion 53 having an internal diameter substantially equal to the internal diameter of the center passageway portion 17. The outer end of the bore 52 is of reduced diameter so as to define a vent port 54, which vent port suitably communicates with the low pressure side of the fluid system, such as the atmosphere. The alignment sleeve 41, at the inner end of the vent port 54, defines a shoulder 56 for supporting one end of a compression spring 57, which spring at its other end bears against the free end of the valve spool 13 for normally urging and maintaining the valve spool in the extreme end position illustrated in FIG. 1. The upper end of the compression spring 57 surrounds the pilot portion 58 provided on the free end of the valve spool for guiding and maintaining the compression spring in engagement therewith.

Considering now the shiftable valve spool 13, same comprises an elongated rod 61 disposed within the passageway 16, particularly within the center passageway portion 17. The rod 61 has a pair of axially spaced hub portions 62 and 63 fixedly, here integrally, secured thereto. Hub portions 62 and 63 are surrounded by resilient elastomeric seal rings 64 and 66, respectively, which seal rings are received within suitable grooves formed in the hubs whereby the seal rings are thus axially secured relative to the rod 61. The seal rings 64 and 66 are preferably O-rings and have an external diameter, when in the undeformed state, slightly greater than the diameter of the center passageway portion 17 whereby the O-rings 64 and 66 will slideably and sealingly engage either the wall defining the center passageway portion 17 or the internal wall defining the enlarged bore portions 34 and 53. The O-rings 64 and 66 are preferably axially spaced apart by a distance substantially equal to the axial spacing between the annular slot-like passages 32 and 47 for a purpose to be explained hereinafter.

The axial shifting movement of the valve spool 13 is controlled by means of the external actuator 14, which actuator specifically includes a first stem portion 67 fixedly, here integrally, secured to the hub portion 62. The first stem portion 67 extends axially through the bore 33 of the alignment sleeve 26 and is of smaller diameter so as to define an annular passageway 71 therebetween. The first stem portion 67 is fixedly, here integrally, connected to a second enlarged stem portion 68 by means of an intermediate tapered portion 69, which tapered portion is disposed adjacent the outer axial end of the alignment sleeve 26. The second stem portion 68 has a diameter substantially equal to the diameter of the bore 33 so as to be snugly and slideably receivable therein when the actuator is moved into the extreme end position illustrated in FIG. 4.

The second stem portion 68 is fixedly connected to a cylindrical guide member 72, which guide member 72 is provided with an external actuator button 73 thereon. The cylindrical guide member 72 is disposed within a cylindrical sleeve portion 76 which is fixedly, here integrally, secured to and extends outwardly from one end of the housing 12. The housing sleeve portion 76 is provided with an internal bore 77 extending therethrough, which bore is coaxially with and in continuous communication with the central passageway 16. The cylindrical guide member 72 is provided with a plurality of flats 78 (FIG. 5) on the periphery thereof so as to define one or more passageways 79 therepast.

The housing sleeve portion 76 is provided with a free axial end face 81 which functions as a stop surface for coacting with an abutting the undersurface 82 of the actuator button 73 for limiting the inward axial movement of the valve spool substantially as illustrated in FIG. 4. The axial movement of the valve spool in the opposite direction is similarly limited by means of a shoulder 83 formed on the hub portion 62, which shoulder is adapted to contact a similar shoulder 84 formed on the alignment sleeve 26 in the manner as illustrated in FIG. 1.

As illustrated in FIG. 3, the end face 29 and the shoulder 31 are preferably each provided with beveled edges 86 and 87, respectively, which beveled edges thus substantially minimize the wear of the resilient O-ring 64. The end face 44 and shoulder 46 defining the other annular passage 47 are also similarly provided with suitable beveled edges thereon.

The valve assembly 11 illustrated in FIGS. -5 can be actuated manually if desired, or it can be automatically actuated by means of an automatic operating device, such as by either the resetable operating device disclosed in my copending application Ser. No. 13,307 or by the snap operator disclosed in my copending application Ser. No. 13,306. For this purpose, the housing sleeve portion 76 is provided with an external thread 88 thereon for permitting the housing sleeve portion 76 to be threadedly engaged within an operator housing for permitting the valve assembly and the operator to be fixedly interconnected. This interconnection between an operator and the valve assembly is more clearly illustrated in FIG. 1 of my copending application Ser. No. 13,307.

OPERATION

The operation of the valve assembly illustrated in FIGS. 1-5 will be described in detail hereinbelow to insure a better understanding thereof.

Assuming first that the first fluid passage 21 is connected to an external supply of pressure fluid and the second and third fluid passages 22 and 23 are each individually connected to a suitable load device, such as the opposite ends of a pneumatic control cylinder, pressurized fluid when supplied to the inlet passage or port 21 will be supplied to either the fluid passage 22 or 23, hereinafter referred to as the first and second load ports, respectively. Due to the urging of the spring 57, the valve spool 13 will normally be maintained in the position illustrated in FIG. 1, in which position the first load port 22 is normally open and in communication with the inlet port 21, whereas the second load port 23 is normally closed and thus in communication with vent port 54.

Considering now the operation when the valve is positioned as illustrated in FIG. 1, pressurized fluid, such as pressurized air, will be supplied to the inlet port 21, whereupon the fluid will flow through the center passageway portion 17 and through the annular passage or port 32 into the annular passageway 28, whereupon the fluid will then flow through the first load port 22 for supplying or actuating an external load or control device. In this position, the resilient O-ring 64 is disposed in snug sealing engagement with the internal wall of the enlarged bore portion 34 so as to prevent the passage of pressure fluid to the vent port 24.

The other resilient O-ring 66, when in the FIG. 1 position, is disposed in sealing engagement with the internal wall defining the center passageway portion 17, thereby preventing the flow of pressurized air to the second load port 23. However, since the O-ring 66 is disposed above the annular passage or port 47, the fluid contained within the system connected to the second load port 23 will flow through the port 23 into the annular passageway 43 and through the annular port 47 into the enlarged bore portion 53, whereupon the fluid will then flow through the bore 52 so as to be discharged through the vent port 54.

When it is desired to supply pressurized fluid to the second load port 23, then the actuator button 73 will be depressed, either manually or by other means as desired, so as to axially move the valve spool 13 against the spring 57, into the other extreme position as illustrated in FIG. 4. The shifting movement of the valve spool is limited due to the button 73 contacting the end surface 81 of the housing sleeve portion 76. When the valve spool reaches the FIG. 4 position, then pressurized air will flow from inlet port 21 through annular port 47 into the second load port 23, communication with the vent port 54 being prevented by means of the resilient O-ring 66 sealingly engaging the internal wall of the enlarged bore portion 53. At the same time, the other resilient O-ring 64 sealingly engages the wall defining the center passageway portion 17 so as to prevent the supplied pressurized air from communicating with the first load port 22. Instead, the first load port 22 will communicate with the bore 33 formed within the alignment sleeve 26 by means of the annular port 32 therebetween, whereupon the first load port 22 will thus be in communication with the vent port 24 for venting to the low pressure side of the system, such as the atmosphere.

When the valve spool is positioned as illustrated in FIG. 4, the second stem portion 68 extends into the bore 33 and is snugly received therein to prevent any substantial amounts of fluid from passing into the space beneath the cylindrical guide member 72. This thus requires that a major portion of the discharged fluid pass through the vent port 24. However, since some of the fluid may still pass into the space beneath the cylindrical guide member 72, this fluid will be freely vented to the atmosphere through the passageways 79 provided by the flats on the guide member, thereby preventing accumulation of pressure fluid under the guide member 72, which accumulation of pressure fluid might be sufficient to cause a premature resetting or reshifting of the valve spool. The passageways 79 also provide for the free escape of pressure fluid during the shifting operation so as to prevent pressure fluid from accumulating under the cylindrical guide member 72 and impeding, if not preventing, the free shifting movement of the valve spool from the FIG. 1 to the FIG. 4 position.

The operation as described above has dealt solely with the operational positions determined by the extreme spool positions illustrated in FIGS. 1 and 4. However, as the valve spool is shifted between the extreme positions illustrated in FIGS. 1 and 4, it passes through a "blocked center" position as illustrated in FIG. 2. Particularly, as the valve spool 13 is initially moved downwardly from the FIG. 1 position, the resilient seal ring 64 will be moved downwardly so as to be disposed directly radially opposite the annular port 32, whereupon the resilient seal ring 64 will expand into and sealingly engage the port 32 so as to substantially prevent any fluid flow therethrough. Simultaneous with the above operation, the resilient O-ring 66 will also move downwardly into sealing engagement with the lower annular port 47 since the seal rings 64 and 66 are axially spaced apart by a distance equal to the axial spacing between the ports 32 and 47 as explained above. When the valve spool is momentarily in this intermediate position illustrated in FIG. 2, the inlet supply port 21, the load ports 22 and 23, and the vent ports 24 and 54 will all be individually isolated from one another so that no fluid flow will occur through the valve assembly 11. This thus prevents any cross-flow between the load ports 22 and 23, and also prevents any through-flow from the inlet port 21 to either of the vent ports 24 or 54. Continued downward movement of the valve spool 13 then causes the spool to assume the position illustrated in FIG. 4 whereupon operation in the manner as described above is then possible.

The closed center position illustrated in FIG. 2 is made possible according to the present invention by utilizing annular ports 32 and 47 surrounding the valve spool 13, which annular ports have a relatively narrow axial width which is substantially smaller than the cross-sectional diameter of the seal rings 64 and 66 (as illustrated in FIG. 3) so as to be sealable by means of an annular seal ring 64 or 66. Further, inasmuch as the annular ports 32 and 47 are defined by two members, namely the housing member 12 and the alignment sleeve 26 or 41, the edges defining the ports can be easily and conveniently rounded or beveled prior to assembly, whereupon the assembled valve device thus possesses valve ports which have no sharp edges so as to cause no undue wear on the seal rings 64 and 66.

Most conventional shiftable spool valve assemblies have, prior to the present invention, provided the resilient seal rings stationarily positioned relative to the housing with the seal rings being disposed in slideable sealingly engagement with the shiftable spool. This construction was often necessary since the ports in prior valve housings have generally constituted conventional circular ports in direct communication with the central valve spool passageway. These ports necessarily resulted in relatively sharp edges and, accordingly, the O-rings or resilient seal rings were normally stationarily secured to the housing so as to not slideably pass over the ports since this type of action resulted in rapid seal wear and deterioration. This problem has been overcome in the present invention by constructing annular ports in the manner as described above, which annular ports thus permit the resilient O-rings to be mounted directly on and movable with the valve spool whereupon the resilient seal rings can thus be utilized to create the closed center position without encountering the excessive wear which normally existed in the prior known devices.

MODIFICATIONS

Parts or components of the embodiments illustrated in FIGS. 6-9 will be referred to by the same reference numerals designating corresponding parts of the embodiment illustrated in FIGS. 1-5, but with the suffix "A," "B," "C," and "D" added thereto, respectively.

FIG. 6 illustrates therein a lever-type external actuator 14A which can be utilized for controlling the shifting movement of the spool assembly 13 illustrated in the embodiments of FIGS. 1-5. The lever actuator assembly 14A specifically includes a lever 91 pivotally connected to the housing sleeve portion 76A by means of a pivot pin 92. The lever 91 is provided with a first cam notch 93 which receives therein a rounded end portion formed on the stem 68A, which stem is fixedly interconnected to the valve spool 13 (FIG. 1) for causing axial shifting thereof. The notch 93, when engaged with the stem 68A, maintains the valve spool in the FIG. 1 position. The lever is also provided with a second cam notch 94 which, when in engagement with the rounded end of the stem 68A, maintains the valve spool in the FIG. 4 position. Lever 91 thus maintains the valve spool positively in either the FIG. 1 or the FIG. 4 position, with the spring 57 causing the valve spool to return to the FIG. 1 position when the lever 91 is pivotally moved into the position illustrated in FIG. 6.

FIG. 7 also illustrates therein a lever actuated mechanism 14B which can be used for controlling the shifting of the valve spool 13 illustrated in FIG. 1. The lever assembly 14B also includes a lever 91B pivotally connected to the housing sleeve portion 76B by means of an intermediate pivot pin 92B. The lever is provided with a cam recess 93B therein which engages the rounded end of the stem 68B when the valve spool 13 is resiliently urged into its upper end position as illustrated in FIG. 1. Pivotal movement of lever 91B in either direction from the position illustrated in FIG. 6 causes the rounded end of the stem 68B to be contacted by one of the cam lobes 96 or 97, which cam lobes cause the stem 68B and the valve spool 13 to be cammed downwardly into the FIG. 4 position. However, the valve spool is maintained in the FIG. 4 position only so long as the lever 91B is held in the angularly deflected position since release of the lever 91B causes it to be pivotally swung back into the neutral position illustrated in FIG. 7 due to the urging of the spring 57.

The valve assembly illustrated in FIG. 8 is substantially identical to the valve assembly illustrated in FIG. 1 except that it is provided with an actuator mechanism 14C which, rather than being provided with a conventional push button 73 as illustrated in FIG. 1, is instead provided with a push-pull button 73C, which button is provided with an undercut recess 98 for enabling the button 73C to be manually grasped so as to be not only pushed downwardly, as in the embodiment in FIG. 1, but also enabling it to be pulled upwardly so that the valve spool can be shifted from the FIG. 4 position to the FIG. 1 position. Since the button 73C is of the push-pull type, the FIG. 8 embodiment does not include therein the spring 57 and thus the valve spool 13 remains in either the FIG. 1 or the FIG. 4 position, its position being determined solely by the push or pull force exerted on the button 73C.

FIG. 9 illustrates still a further valve assembly embodiment which is of the push-pull type. The FIG. 9 embodiment includes therein a push-type external actuator 14 disposed adjacent the upper end of the housing for controlling the shifting of the valve spool 13 from the FIG. 1 to the FIG. 4 position. However, the FIG. 9 embodiment does not utilize therein the spring 57 and thus the valve spool will remain in the FIG. 4 position when the upper actuator button 73 has been depressed so as to come into contact with the upper end of the housing sleeve portion 76. The lower end of the valve assembly illustrated in FIG. 9 is provided with an alignment sleeve 26D which is identical to the upper alignment sleeve 26 and is also provided with a further external actuator mechanism 14D which is identical to the upper actuator mechanism 14, same being partially positioned within and extended through a further housing sleeve portion 76D which is identical to the upper housing sleeve portion 76 and extends outwardly from the housing at the opposite end thereof. The lower actuator mechanism 14D is utilized for shifting the valve spool from the FIG. 4 to the FIG. 1 position by applying a pushing force onto the actuator button 73D.

Although particular preferred embodiments of the invention have been disclosed above for illustrative purposes, it will be understood that obvious or equivalent variations or modifications thereof are fully contemplated.

The embodiments of the invention in which an exclusive property or privilege is claimed are defined as follows:

1. A valve assembly, comprising:

housing means having an elongated bore extending therethrough;

first and second port means formed in said housing means, each of said port means being adapted to be connected to a load or control device;

third port means formed in said housing means and communicating with a central portion of said bore, said third port means being adapted to be connected to a supply of pressure fluid;

first sleeve means disposed within said bore adjacent one end thereof and first mounting means radially floatably mounting said first sleeve means relative to said housing means;

second sleeve means disposed within said bore adjacent the other end thereof and second mounting means radially floatably mounting said second sleeve means relative to said housing means;

said first sleeve means and said housing means cooperating to define a first intermediate passage providing communication between said first port means and said bore, said second sleeve means and said housing means cooperating to define a second intermediate passage providing communication between said second port means and said bore, said first and second intermediate passages respectively comprising first and second narrow slot-like grooves extending radially outward relative to said bore and communicating with said bore around substantially the complete peripheral extent thereof, said first and second slot-like grooves each having a small axial width while communicating with said bore at axially spaced locations which are a predetermined distance apart and disposed on opposite axial sides of said third port means; and valve spool means positioned within and axially shiftable relative to said bore for controlling the flow of fluid between said port means, said valve spool means including an elongated rod member disposed within said bore and having first and second annular elastomeric seal rings axially secured thereto and disposed in surrounding relationship therewith, said first and second seal rings being axially spaced apart by a distance substantially equal to said predetermined distance, and each of said seal rings having an axial thickness substantially greater than the axial width of said slot-like grooves, whereby said first and second seal rings respectively cooperate with and close the first and second slot-like grooves during shifting of the valve spool for controlling the flow of fluid between said port means.

2. A valve assembly according to claim 1, wherein said first and second sleeve means each have a stepped configuration defining a shoulder therebetween, and said housing means has first and second shoulders formed therein adjacent the opposite ends of said bore, said first and second shoulders being disposed adjacent and opposite the shoulders on said first and second sleeve means, respectively, and first and second annular rings of elastomeric material disposed within said bore in surrounding relationship to said first and second sleeve means, respectively, said rings being stationarily positioned relative to said housing means and being disposed between the opposed shoulders as formed on said housing means and the respective sleeve means for retaining the respective sleeve means relative to the housing means while permitting relative movement therebetween.

3. A four-way assembly, comprising:

housing means including wall means defining a bore, said bore having first and second end portions and an intermediate center portion;

first passage means formed in said housing means and communicating with the center portion of said bore;

second and third passage means respectively communicating with the first and second end portions of said bore;

fourth passage means communicating with said bore at a location disposed axially between said first and second passage means, and fifth passage means communicating with said bore at a location disposed axially between said first and third passage means;

first and second sleeve means respectively positioned within said first and second end portions of said bore in substantially coaxial alignment with said center portion of said bore, at least a portion of said first and second sleeve means as disposed adjacent the center portion of said bore having an internal diameter substantially equal to the internal diameter of said center portion of said bore;

first and second mounting means respectively connecting said first and second sleeve means to said housing means for substantially axially securing said first and second sleeve means relative to said housing means while permitting at least limited radial or angular movement of said first and second sleeve means relative to said housing means to facilitate alignment thereof with said center portion of said bore;

said housing means and said first sleeve means having spaced opposed surfaces defining therebetween a first narrow slot-like passageway which extends completely around the periphery of said bore, said first slot-like passageway extending radially relative to said bore and providing communication between said bore and said fourth passage means;

said housing means and said second sleeve means also having spaced opposed surfaces defining therebetween a second narrow slot-like passageway which extends completely around the periphery of said bore, said second passageway extending radially relative to said bore and providing communication between said bore and said fifth passage means;

valve spool means positioned within and shiftable relative to said bore for controlling the flow of pressure fluid between the plurality of said passage means, said valve spool means having seal means thereon for individually isolating each of said passage means during axial shifting of said spool means;

said seal means including first and second annular seal rings constructed of elastomeric material and disposed in surrounding relationship to said valve spool means, said first and second seal rings being respectively disposed for coaction with said first and second slot-like passageways and being axially spaced apart by a distance substantially equal to the axial spacing between said slot-like passageways, and said first and second seal rings respectively having axial widths at least slightly greater than the axial widths of said first and second slot-like passageways for permitting total closure of both said slot-like passageways when said valve spool means is axially shifted into a center closed position, said first and second seal rings causing each of the passage means to be individually isolated from all of the remaining passage means when said valve spool means is in said center closed position; and actuator means interconnected to said valve spool means for permitting selective axial shifting thereof into first or second operative positions disposed on opposite axial sides of said center closed position;

said valve spool means in said first operative position permitting flow of fluid between said first and fourth passage means and between said third and fifth passage means due to said first seal ring being disposed in sealing engagement with said first sleeve means and said second seal ring being disposed in sealing engagement with the center portion of said bore axially between said first passage means and said second slot-like passageway;

said valve spool means when in second operative position permitting flow of fluid between said first and fifth passage means and between said second and fourth passage means due to said second seal ring being disposed in sealing engagement with second sleeve means and said first seal ring being disposed in sealing engagement with the center portion of said bore axially between said first passage means and said first slot-like passageway, whereby axial shifting of said valve spool means between first and second operative positions causes said first and second seal rings to totally close said first and second slot-like passageways for individually isolating each of the passage means form all of the remaining passage means.

4. A valve assembly according to claim 3, wherein said third passage means comprises a port formed in the outer axial end of said second sleeve means, said port being substantially coaxially aligned with said bore, and said second passage means communicating with said bore adjacent the outer axial end of said first sleeve means.

5. A valve assembly according to claim 3, wherein said housing means includes a reduced diameter cylindrical sleeve portion provided adjacent one end thereof in coaxial alignment with and forming an extension of said bore, and said actuator means including a first portion fixedly interconnected to said valve spool means and movably disposed within said cylindrical sleeve portion of said housing means, said actuator means further including a second portion interconnected to and extending outwardly from said first portion so as to be disposed externally of and outwardly from the end of the cylindrical sleeve portion for enabling said first and second portions of said actuator means to be moved between first and second positions, whereby the actuator means causes a corresponding movement of said valve spool means between said first and second operative positions, said first portion having a cross-sectional area substantially less than the cross sectional area of the opening defined by the cylindrical sleeve portion for defining a flow passage therebetween for preventing entrapment of pressure fluid within said cylindrical sleeve portion.

6. A valve assembly according to claim 3, wherein said valve spool means includes an elongated rod-like spool member having a diameter less than the internal diameter of the center portion of said bore for defining an annular passage therebetween for normally permitting flow of pressure fluid between the related passage means, at least one end of said spool member extending axially outwardly of said housing means for interconnection to said actuator means, said first and second elastomeric seal rings constituting the only seal rings disposed for coaction between said valve spool means and the housing means or the first and second sleeve means.

7. A valve assembly according to claim 3, wherein said first and second mounting means each includes an annular ring of elastomeric material disposed within said bore in surrounding relationship to its respective sleeve means, said ring being substantially stationarily positioned relative to said housing means.

8. A valve assembly according to claim 7, wherein said first and second sleeve means each includes a sleeve portion having a diameter smaller than the diameter of the surrounding portion of said bore for respectively defining first and second narrow axially elongated annular passages therebetween, said first annular passage providing direct communication between the fourth passage means and the first slot-like passageway, and the second annular passage providing direct communication between the fifth passage means and the second slot-like passageway.

9. A four-way valve assembly, comprising:
 housing means including wall means defining an elongated cylindrical bore;
 said housing means having first and second exhaust ports formed therein and communicating with said bore adjacent the opposite axial ends thereof;
 said housing means also having a fluid supply port formed therein and communicating with said bore adjacent the center portion thereof;
 said housing means still further having first and second load ports formed therein and communicating with said bore on opposite axial sides of said supply port, said first load port terminating in a narrow slot-like annular passageway which extends radially outwardly relative to said bore and communicates with said bore around substantially the complete peripheral extend thereof, said second load port terminating in a second narrow slot-like annular passageway substantially identical to said first slot-like passageway, said first slot-like passageway being disposed axially between said first exhaust port and said supply port, and said second slot-like passageway being axially disposed between said second exhaust port and said supply port, said first and second slot-like passageways being axially spaced a predetermined distance apart;
 valve spool means positioned within and shiftable relative to said elongated passageway for controlling the flow of pressure fluid between said plurality of ports, said valve spool means having seal means thereon for individually isolating each of said ports during axial shifting of said spool;
 said seal means consisting solely of first and second annular elastomeric seal rings axially secured to said valve spool means in surrounding relationship therewith, said seal rings being disposed in sliding and sealing engagement with the walls defining said bore and having an axial thickness greater than the axial width of said first and second slot-like passageways, said first and second seal rings being axially spaced said predetermined distance apart whereby said seal rings completely close said first and second slot-like passageways for totally isolating each of said ports from the remaining ports when the valve spool is in a closed center position, said valve spool being axially shiftable into first and second operative positions disposed on opposite sides of said closed center position for permitting pressure fluid to be supplied from said supply port to said first and second load ports when said spool is in said first and second operative positions, respectively.

10. A valve assembly according to claim 9, wherein said valve spool means comprises an elongated rod-like member having a diameter less than said bore for defining an annular ring-like flow passageway for providing communication between said plurality of ports, flow of pressure fluid between said ports through said annular flow passageway being controlled solely by said first and second seal rings.

11. A valve assembly according to claim 9, wherein said housing means has a reduced diameter cylindrical sleeve portion provided adjacent one end thereof in coaxial alignment with and forming an extension of said bore, and actuator means operatively interconnected to said valve spool means for causing axial shifting thereof between said first and second operative positions, said actuator means including a guide portion slideably disposed within said cylindrical sleeve portion, said guide portion having a cross-sectional area substantially less than the area of the opening defined in said cylindrical sleeve portion for providing a flow passage therebetween, and said actuator means further including a second portion interconnected to and extending outwardly from said guide portion so as to be disposed externally of and outwardly from the end of the cylindrical sleeve portion for enabling said actuator means to be moved between said first and second operative positions.

* * * * *